US012658516B2

(12) United States Patent
Cha et al.

(10) Patent No.: US 12,658,516 B2
(45) Date of Patent: Jun. 16, 2026

(54) BATTERY CASE AND MOTOR VEHICLE COMPRISING SAME

(71) Applicants: POSCO, Pohang-si (KR); ASAN CO., LTD., Gimpo-si (KR)

(72) Inventors: Myung-Hwan Cha, Incheon (KR); Sang-Kwon Wee, Incheon (KR); Don-Gun Kim, Incheon (KR); Geun-Ho Kim, Gimpo-si (KR); Seong-Min Cho, Gimpo-si (KR); Kyu-Rae Kim, Gimpo-si (KR); Seung-Ho Yoo, Gimpo-si (KR)

(73) Assignees: POSCO, Pohang-si (KR); ASAN CO., LTD., Gimpo-si (KR)

( * ) Notice: Subject to any disclaimer, the term of this patent is extended or adjusted under 35 U.S.C. 154(b) by 741 days.

(21) Appl. No.: 17/776,079

(22) PCT Filed: Nov. 11, 2020

(86) PCT No.: PCT/KR2020/095136
§ 371 (c)(1),
(2) Date: May 11, 2022

(87) PCT Pub. No.: WO2021/096333
PCT Pub. Date: May 20, 2021

(65) Prior Publication Data
US 2022/0393286 A1 Dec. 8, 2022

(30) Foreign Application Priority Data
Nov. 13, 2019 (KR) ........................ 10-2019-0145262

(51) Int. Cl.
*H01M 50/242* (2021.01)
*H01M 50/244* (2021.01)
(Continued)

(52) U.S. Cl.
CPC ....... *H01M 50/242* (2021.01); *H01M 50/244* (2021.01); *H01M 50/249* (2021.01); *B60L 50/64* (2019.02); *H01M 2220/20* (2013.01)

(58) Field of Classification Search
None
See application file for complete search history.

(56) References Cited

U.S. PATENT DOCUMENTS

2011/0143179 A1 6/2011 Nakamori
2013/0026786 A1 1/2013 Saeki
(Continued)

FOREIGN PATENT DOCUMENTS

CN 102897010 A 1/2013
CN 109131592 A 1/2019
(Continued)

OTHER PUBLICATIONS

JP H0781432 A Machine Translation (Year: 1995).*
(Continued)

*Primary Examiner* — Victoria H Lynch
(74) *Attorney, Agent, or Firm* — Sughrue Mion, PLLC

(57) ABSTRACT

The battery case according to one embodiment may comprise: a base plate member; a support member which surrounds the base plate member, has a closed cross-section, and supports the base plate member; and an absorption member which is coupled to the outside of the support member so as to form a closed cross-section and absorbs external impacts.

11 Claims, 8 Drawing Sheets

(51) Int. Cl.
  H01M 50/249    (2021.01)
  B60L 50/64    (2019.01)

(56)       References Cited

U.S. PATENT DOCUMENTS

| 2013/0270864 | A1 |   | 10/2013 | Young et al. |  |
| 2016/0236713 | A1 |   | 8/2016 | Sakaguchi et al. |  |
| 2018/0370570 | A1 |   | 12/2018 | Ayukawa |  |
| 2019/0255930 | A1 |   | 8/2019 | Steiner et al. |  |
| 2021/0146766 | A1 | * | 5/2021 | Haberl | ..................... B60L 50/64 |

FOREIGN PATENT DOCUMENTS

| DE | 10 2016 013 633 | A1 |   | 5/2018 |  |
| JP | 7-69237 | A |   | 3/1995 |  |
| JP | H0781432 | A | * | 3/1995 | ............. Y02E 60/10 |
| JP | 7-186732 | A |   | 7/1995 |  |
| JP | 10-86852 | A |   | 4/1998 |  |
| JP | 2001-97049 | A |   | 4/2001 |  |
| JP | 2007-176395 | A |   | 7/2007 |  |
| JP | 2013-028191 | A |   | 2/2013 |  |
| JP | 2015-074244 | A |   | 4/2015 |  |
| JP | 2019-6303 | A |   | 1/2019 |  |
| KR | 10-1998-0035495 | A |   | 8/1998 |  |
| KR | 10-0257872 | B1 |   | 6/2000 |  |
| KR | 10-2011-0066088 | A |   | 6/2011 |  |
| KR | 10-1230449 | B1 |   | 2/2013 |  |
| KR | 10-2014-0034505 | A |   | 3/2014 |  |
| KR | 20170039948 | A | * | 4/2017 | .......... H01M 2/1083 |
| KR | 10-2021-0058151 | A |   | 5/2021 |  |
| WO | 2014/118955 | A1 |   | 8/2014 |  |
| WO | 2018/221002 | A1 |   | 12/2018 |  |

OTHER PUBLICATIONS

Machine translation KR20170039948A (Year: 2017).*
International Search Report for PCT/KR2020/095136 dated Feb. 23, 2021.
Extended European Search Report issued Feb. 20, 2024 in Application No. 20887912.2.
Chinese Office Action issued Mar. 1, 2024 in Application No. 202080078244.5.
Office Action issued May 30, 2023 in Japanese Application No. 2022-526428.

* cited by examiner

<u>1</u>

(a)

(b)

BATTERY CASE AND MOTOR VEHICLE COMPRISING SAME

CROSS REFERENCE TO RELATED APPLICATIONS

This application is a National Stage of International Application No. PCT/KR2020/095136 filed Nov. 11, 2020, claiming priority based on Korean Patent Application No. 10-2019-0145262 filed Nov. 13, 2019, the entire disclosures of which are incorporated herein by reference.

TECHNICAL FIELD

The present disclosure relates to a battery case and a motor vehicle including the same.

BACKGROUND ART

A battery pack of an electric motor vehicle may be configured in such a manner that a module, an assembly of secondary battery cells, is provided as a plurality of modules and the plurality of modules are mounted therein.

A motor vehicle equipped with the battery pack may lead to fire and explosion in the event of a collision involving the motor vehicle, causing a serious risk to a driver and passengers.

SUMMARY OF INVENTION

Technical Problem

An aspect of the present disclosure is to provide a battery case capable of effectively absorbing external impacts and maintaining a shape thereof, and a motor vehicle including the same.

Another aspect of the present disclosure is to provide a battery case capable of stably fixing a battery pack, and a motor vehicle including the same.

Solution to Problem

According to an aspect of the present disclosure, a battery case includes a base plate member; a support member surrounding the base plate member, formed to have a closed cross-section, and supporting the base plate member; and an absorption member coupled to an outer side surface of the support member to form a closed cross-section, and absorbing external impacts.

Specifically, the absorption member of the battery case according to an embodiment may include a face plate portion disposed to be spaced apart from the support member by a predetermined interval; and a spacer plate portion disposed between the support member and the face plate portion.

In this case, at least a portion of the spacer plate portion of the battery case according to an embodiment may include a wrinkle induction groove, wherein the wrinkle induction groove may be formed to have a bellows shape.

In addition, the absorption member and the support member of the battery case according to an embodiment may be integrally formed by forming both end portions of a plate material to have a square closed cross-section, folding a central portion of the plate material at a right angle to form a contact point with which vertices of the square closed cross-section on the both end portions are in contact, and welding the contact point.

Further, the support member of the battery case according to an embodiment may include a support pipe in an internal space forming the closed cross-section.

In addition, the battery case according to an embodiment may include a pack fixing member including one end portion coupled to the base plate member and the other end portion having a bent shape, and supporting an upper surface of a battery pack seated on the base plate member.

In this case, the pack fixing member of the battery case according to an embodiment may be provided to have a continuous form in a width direction of the base plate member.

In addition, the battery case according to an embodiment may include a holding member coupled to an upper portion of the pack fixing member.

In this case, the holding member of the battery case according to an embodiment may include a recess portion interposed in a gap between a plurality of the pack fixing member, adjacent to each other.

In addition, the recess portion of the battery case according to an embodiment may be provided to form a leaf spring expanding outwardly by elasticity.

In addition, the holding member of the battery case according to an embodiment may be provided to fill the recess portion with a buffer material.

A motor vehicle according to an embodiment may include the aforementioned battery case in which a plurality of battery packs are mounted; an engine connected to the battery pack to provide driving force; and a body frame to which the engine is installed and the battery case is coupled.

Advantageous Effects of Invention

According to an aspect of the present disclosure, a battery case and a motor vehicle including the same may have advantages of effectively absorbing external impacts and maintaining a shape of a battery pack.

Therefore, it is possible to prevent the battery pack from being deformed and exploded, or it is possible to prevent external impacts from being directly transmitted to the battery pack to explode the battery pack.

According to another aspect of the present disclosure, a battery case and a motor vehicle including the same may have advantages of stably fixing a battery pack.

Various advantages and effects of the present disclosure are not limited to the above, and will be more easily understood in the process of describing specific embodiments of the present disclosure.

BEST MODE FOR INVENTION

Figure 1:
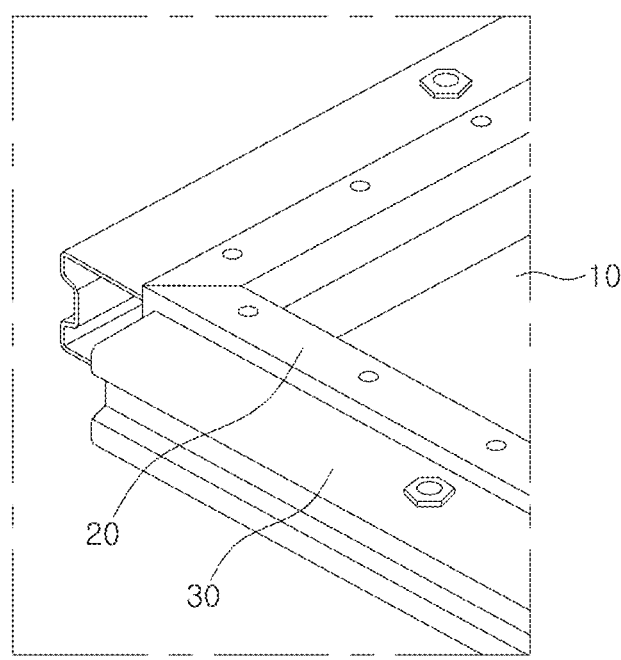
FIG. 1 is a perspective view illustrating a battery case according to an embodiment.

An electric motor vehicle equipped with a battery pack may be prepared fora collision event of the motor vehicle using a reinforcing material for body collision and a reinforcing material for the battery pack.

For a battery case, collision resistance characteristics may be important to protect a battery pack therein, and reinforcement of rigidity against various vibrations induced from a road surface may be important during traveling of the motor vehicle.

In this case, a cover member in an upper portion and a base member in a lower portion, responsible for an outer surface of the battery case, may be mainly manufactured by press molding. To reinforce the battery case, a plurality of reinforcing materials may be added inside and outside the battery case to satisfy performance thereof.

The reinforcing materials should satisfy both roles of maintaining a shape of the battery pack and protecting the battery pack from explosions, as well as absorbing external impacts.

However, although a conventional reinforcing material maintains a shape of a battery pack by reinforcing rigidity thereof, there may be a problem in that they may not effectively absorb external impacts due to deformation.

In addition, a conventional battery case has a problem in that a pack fixing member for fixing an upper portion of a battery pack may be easily bent, and thus the battery pack may not be stably fixed.

Therefore, the present applicant proposes a battery case capable of solving the above-described problems, and a motor vehicle including the same.

Hereinafter, preferred embodiments of the present disclosure will be described with reference to the accompanying drawings. The embodiments may be modified in various other forms, and the scope of the present disclosure is not limited to the embodiments described below. In addition, the embodiments of the present disclosure may be provided to more completely explain the present disclosure to those of ordinary skill in the art. Shapes and sizes of elements in the drawings may be exaggerated for clarity.

Also, in this specification, a singular expression may include a plural expression unless the context clearly dictates otherwise, and the same reference signs or reference signs assigned in a similar manner throughout the specification refer to the same element or corresponding element.

Referring to FIG. 1, a battery case 1 according to an embodiment may include a base plate member 10, a support member 20, and an absorption member 30.

According to an embodiment, the support member 20 may be coupled to a corner portion of the base plate member 10.

According to an embodiment, the support member 20 may be formed to have a closed cross-section.

According to an embodiment, the absorption member 30 may interact with an outer side surface of the support member 20 to form a closed cross-section. Specifically, the absorption member 30 may have an open structure on one surface contacting the support member 20. The absorption member 30 may combine with the support member 20 to form an inner space of the absorption member having a closed cross-section.

As such, a battery case 1 according to an embodiment may include the absorption member 30 to convert external impacts into deformation energy and to effectively absorb external impacts, in addition to including the support member 20 to reinforce rigidity.

For example, the support member 20 may be configured to playa role of reinforcing rigidity that enables the base plate member 10 to maintain a shape thereof against external impacts, and compress and deform the absorption member 30 against external impacts, to absorb external impacts.

Thereby, it is possible to improve a problem in which external impacts are applied to a battery pack 2 seated on the base plate member 10, and also improve a problem in which the battery pack 2 is damaged or exploded due to external impacts.

The base plate member 10 may be a portion on which the battery pack 2 is seated and accommodated. In addition, the support member 20 may be provided in the corner portion of the base plate member 10 to maintain a shape of the base plate member 10 against external impacts. Thereby, it is possible to prevent the battery pack 2 seated on the base plate member 10 from being deformed or damaged and exploded by external impacts.

A support member 20 according to an embodiment may form a closed cross-section in which rigidity is reinforced against external impacts, to reinforce rigidity of the base plate member 10.

A support member 20 according to an embodiment may further include a support pipe 21 in a closed cross-section to further reinforce rigidity, and a detailed description thereof will be described later with reference to FIG. 4.

An absorption member 30 according to an embodiment may serve to absorb external impacts while being deformed in shape with respect to external impacts. To this end, the absorption member 30 may be coupled to the outer side surface of the support member 20 to form a closed cross-section.

An absorption member 30 according to an embodiment may be disposed outside the support member 20 to receive external impacts earlier than the support member 20, to absorb external impacts, while deforming a shape thereof before the support member 20. Therefore, it is possible to improve a problem in which external impacts are transmitted to the battery pack 2 seated on the base plate member 10.

An absorption member 30 according to an embodiment may form a wrinkle induction groove 32*a* to increase an effect of absorbing external impacts by deformation of a shape according to external impacts. A detailed description thereof will be described later with reference to FIG. 2.

An absorption member 30 according to an embodiment may be formed by roll forming, to be integrally prepared with the support member 20. A detailed description thereof will be described later with reference to FIG. 3.

Figure 2:
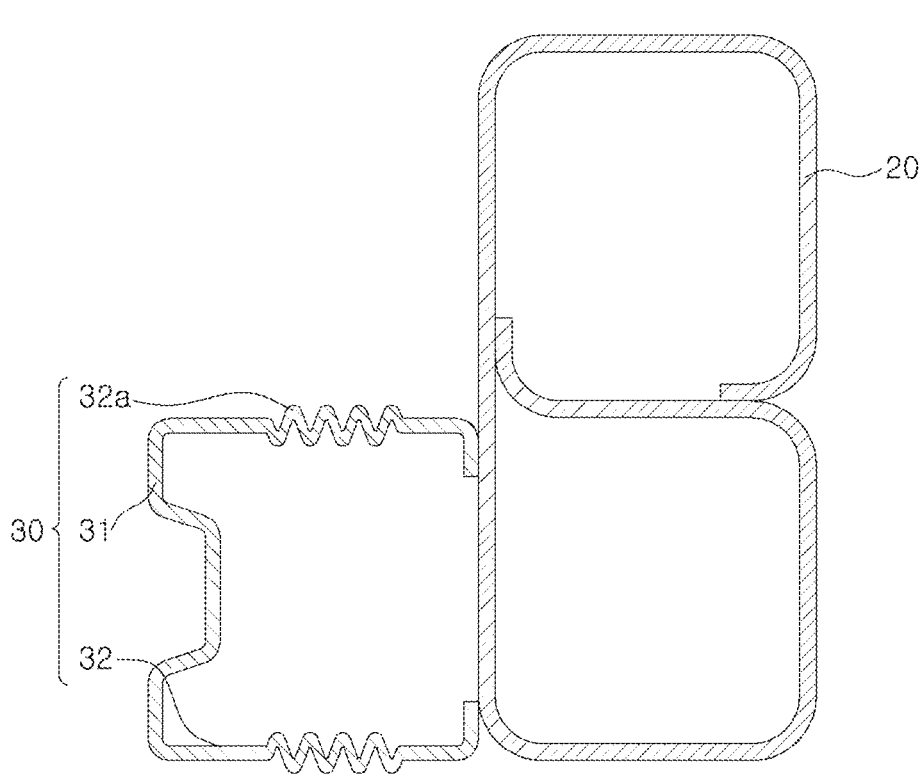
FIG. 2 is a cross-sectional view illustrating an embodiment in which a wrinkle induction groove is formed in an absorption member in a battery case.

Referring to FIG. 2, an absorption member 30 of a battery case 1 according to an embodiment may include a face plate portion 31 disposed to be spaced apart from a support member 20 by a predetermined interval, and a spacer plate portion 32 provided between the support member 20 and the face plate portion 31.

An absorption member 30 according to an embodiment may include a wrinkle induction groove 32*a* formed in at least a portion of the spacer plate portion 32. Therefore, the absorption member 30 according to an embodiment may increase an effect of absorbing external impacts by deformation of a shape according to external impacts.

A wrinkle induction groove 32a according to an embodiment may form a point at which stress is concentrated, when external impacts are applied, may be formed, and deformation may be thus induced in the wrinkle induction groove 32a, as compared to other portions. Therefore, when external impacts are applied, the absorption member 30 may absorb an energy due to external impacts while deformation in shape occurs in the wrinkle induction groove 32a.

A face plate portion 31 according to an embodiment may be a portion of the absorption member 30 facing the support member 20, and may be disposed on an outer side surface of the support member 20. The face plate portion 31 may interact with the outer side surface of the spacer plate portion 32 and the support member 20, to form a closed cross-section.

A spacer plate portion 32 according to an embodiment may be provided between the face plate portion 31 and the support member 20. Specifically, the spacer plate portion 32 may be a portion extending from both end portions of the face plate portion 31 to the support member 20.

As the wrinkle induction groove 32a is formed in a spacer plate portion 32 according to an embodiment, deformation that distorts as stress is concentrated with respect to external impacts may be induced. Therefore, a force for external impacts may be dissipated as deformation energy of the spacer plate portion 32.

Therefore, a battery case 1 according to an embodiment may prevent a problem in which external impacts are directly transmitted to a battery pack 2, and the battery pack 2 then explodes.

A battery case 1 according to an embodiment may include the absorption member 30 absorbing external impacts while being deformed, to reduce external impacts transmitted to the battery pack 2.

A wrinkle induction groove 32a according to an embodiment may be formed to have a shape continuously curved in a width direction of the spacer plate portion 32. For example, the wrinkle induction groove 32a may be formed to have a bellows shape.

As above, the wrinkle induction groove 32a may have a bellows shape continuously curved, to concentrate stress at a plurality of points, and to deform the absorption member 30 while more effectively absorbing external impacts.

Figure 3:
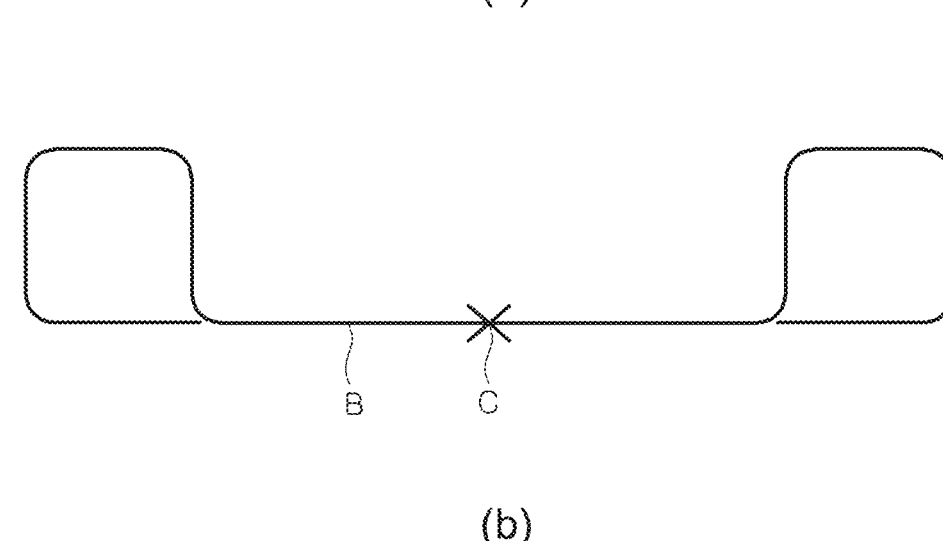
FIG. 3 is a cross-sectional view illustrating a state in which an absorption member is formed by roll forming in a battery case.
Figure 3:
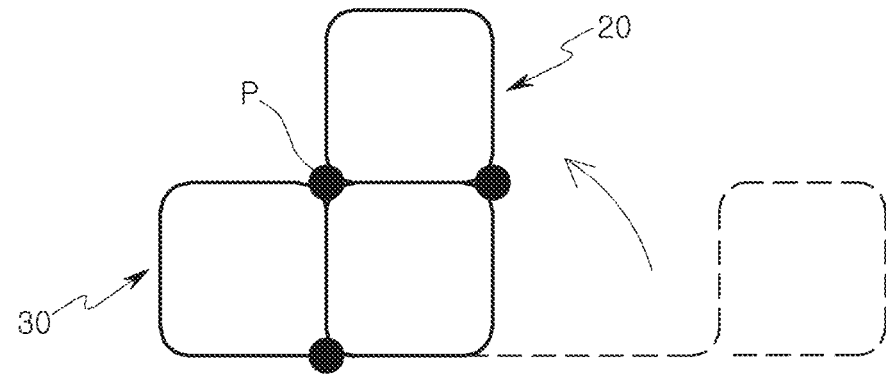

Referring to FIG. 3, an absorption member 30 of a battery case 1 according to an embodiment may be formed by roll forming, to be integrally prepared with a support member 20. A square closed cross-section may be formed in both end portions of a plate material B. Next, the plate material may be bent at a right angle in a central portion C of the plate material B, to contact vertices of the square closed cross-sections on the both end portions. When contact points P of the vertices are formed, the absorption member 30 and the support member 20 may be integrally formed by welding and fixing the contact points P.

More specifically, first, when a plate material B is provided, and both end portions of the plate material B may be formed to have a square closed cross-section by roll forming. For example, reference may be made to portion (a) of FIG. 3.

Thereafter, for example, the central portion C that corresponds to twice a length of one side of the square closed cross-section, may be vertically folded. In this manner, vertices of the square closed cross-section formed in the both end portions of the plate material B may be in contact with each other. A contact point P with which the vertices are in contact may be welded. For example, reference may be made to portion (b) of FIG. 3.

Therefore, the support member 20, integrally formed with the absorption member 30, may be prepared.

When the absorption member 30 is integrally formed with the support member 20 as described above, coupling between the absorption member 30 and the support member 20 may be further strengthened to improve durability. In addition, since formation by the roll forming may be performed without restrictions on strength of a material, there may be an advantage of using a lightweight, high-strength material.

Figure 4:
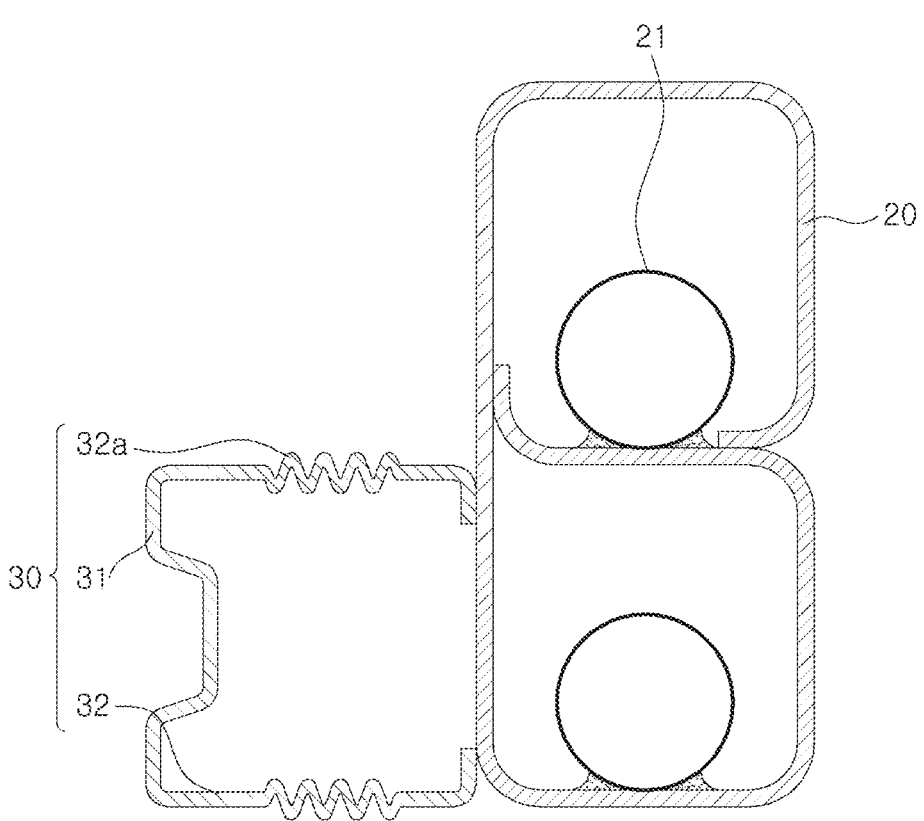
FIG. 4 is a cross-sectional view illustrating an embodiment in which a support pipe is provided on a support member in a battery case.

Referring to FIG. 4, a support member 20 of a battery case 1 according to an embodiment may further include a support pipe 21 in an internal space forming a closed cross-section to further reinforce rigidity.

The support pipe 21 having a tubular shape may be provided in the internal space of the support member 20 in a longitudinal direction of the support member, to further increase an effect of reinforcing rigidity of the support member 20. The support pipe 21 may be coupled to the internal space of the support member 20 by welding, or may be coupled to the internal space of the support member 20 using an adhesive or the like.

Figure 5:
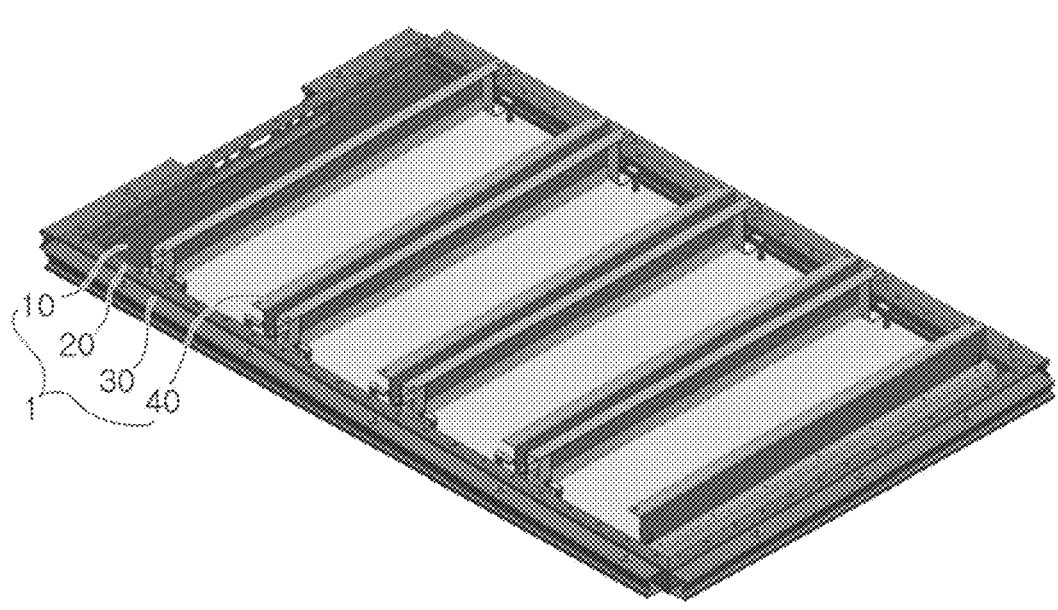
FIGS. 5 to 7 are perspective views illustrating embodiments in which a battery case includes a pack fixing member.
Figure 6:
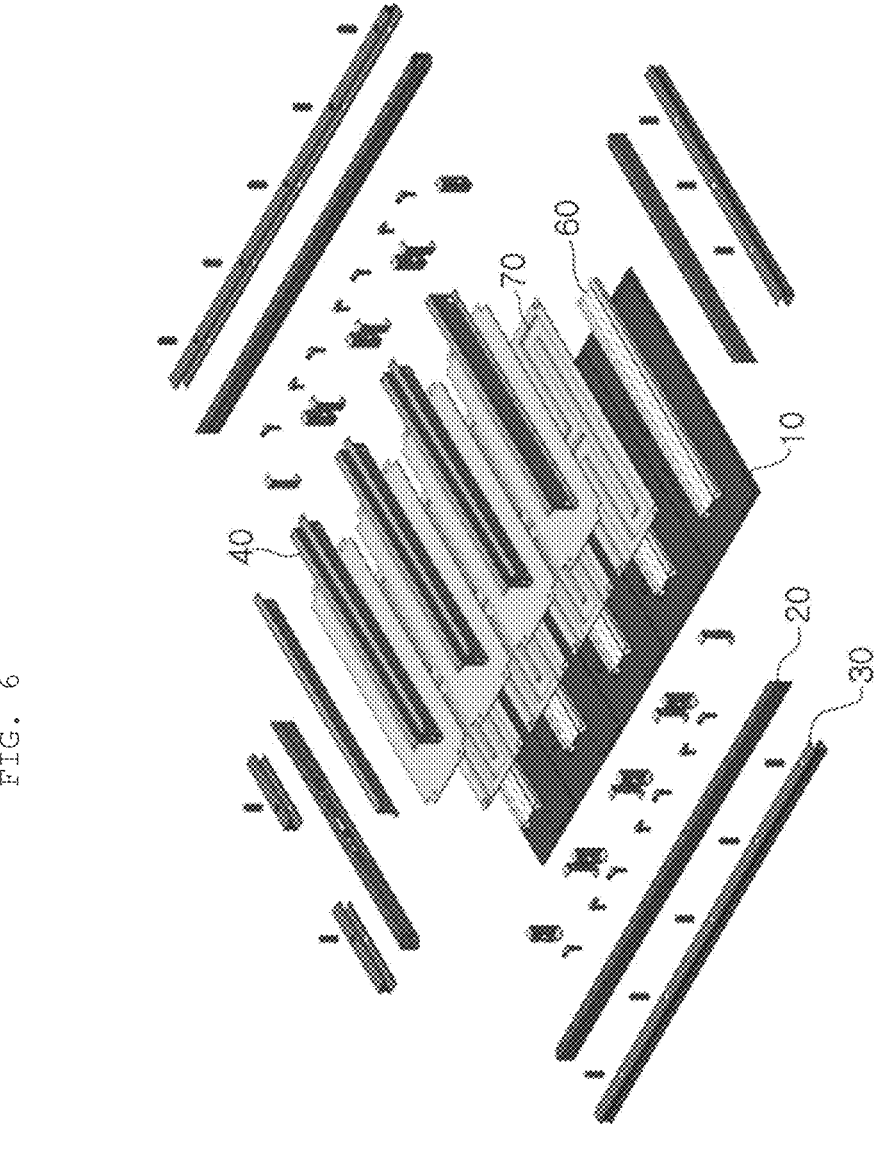
Figure 7:
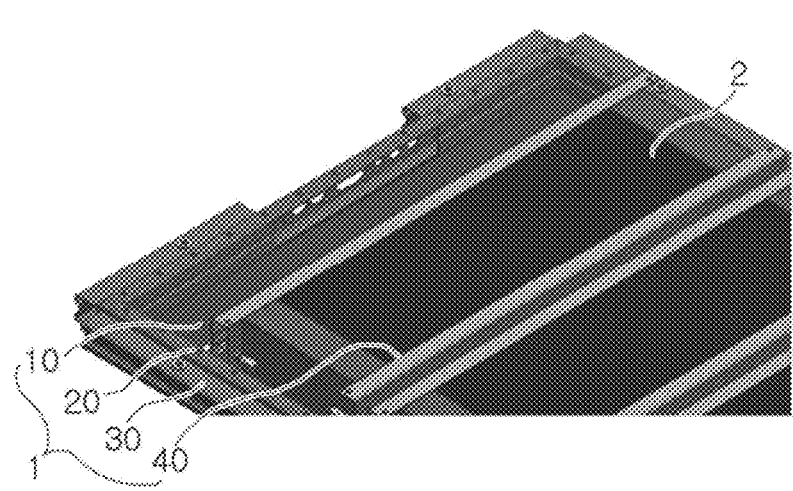

FIGS. 5 to 7 are perspective views illustrating embodiments in which a battery case 1 includes a pack fixing member 40. In this case, FIG. 5 illustrates a battery case 1 in which a pack fixing member 40 is included and in which a battery pack 2 is not seated. FIG. 6 is an exploded view of FIG. 5 for each configuration. FIG. 7 illustrates a battery case 1 in which a pack fixing member 40 is included and in which a battery pack 2 is seated.

Referring to the drawings, a battery case 1 according to an embodiment may include a pack fixing member 40 in which one end portion (e.g., a lower portion) thereof is coupled to a base plate member 10, and the other end portion (e.g., an upper portion) thereof is bent to support an upper surface of a battery pack 2 seated on a base plate member 10.

As such, the pack fixing member 40 may be configured to support the upper surface of the battery pack 2 seated on the base plate member 10, to stably support the battery pack 2.

To this end, the pack fixing member 40 may be formed to have, for example, a cross-section of an approximately "L" shape. A lower end portion of the pack fixing member 40 may be coupled to the base plate member 10, and the other end portion having the bent shape may be in contact with the upper surface of the battery pack 2.

In this case, the pack fixing member 40 of a battery case 1 according to an embodiment may be provided to have a continuous form in the width direction of the base plate member 10.

In this manner, according to the form of the pack fixing member 40, rigidity for supporting the base plate member 10 in the width direction may be reinforced.

Specifically, the pack fixing member 40 may be formed to have a length, corresponding to a width of the base plate member 10, and may be continuously disposed in the width direction of the base plate member 10, to perform for the pack fixing member 40 a role of supporting external impacts applied in a lateral direction of the base plate member 10. Moreover, since the pack fixing member 40 has a cross-section bent in an approximately "L" shape, an effect of rigidity reinforcement may be further enhanced.

Therefore, a size of a transverse reinforcement member 60 that may be separately provided to reinforce rigidity of the base plate member 10 may be reduced, or a configuration of the transverse reinforcement member 60 may be excluded. Thereby, an arrangement space for the battery pack 2 may be secured to form a high energy density, and a weight of a motor vehicle or the like in which the battery case 1 is installed may be also reduced.

In addition, a cooling plate member 70 for cooling the battery pack 2 may be provided on the base plate member 10. A cooling channel through which a cooling fluid flows may be formed in the cooling plate member 70.

A cover member may be provided on the upper surface of the battery pack 2 seated on the base plate member 10.

In a battery case 1 according to an embodiment, the cover member may include a dome portion disposed to face the base plate member 10 and covering the upper surface of the battery pack 2 seated on the base plate member 10; and a flange portion bent in an angled form in a corner portion of the dome portion and fastened to a support member 20.

And, in addition to the transverse reinforcement member 60 for supporting the base plate member 10 in the width direction, a longitudinal reinforcement member for supporting the base plate member 10 in the longitudinal direction may be also provided in the base plate member 10.

For example, the longitudinal reinforcement member may be provided in a continuous form in the longitudinal direction of the base plate member 10. The longitudinal reinforcement member may have a through-groove formed in a portion intersecting the pack fixing member 40.

Figure 8:
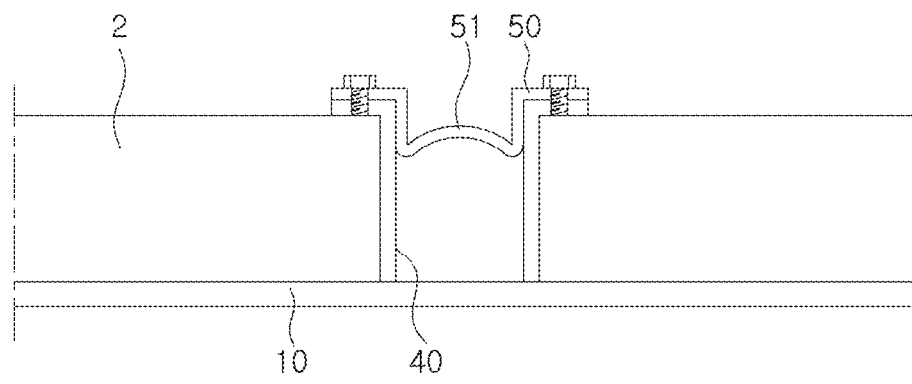
FIG. 8 is a cross-sectional view illustrating an embodiment in which a battery case includes a holding member.

Referring to FIG. 8, a battery case 1 according to an embodiment may include a holding member 50 coupled to upper portions of a plurality of pack fixing members 40 adjacent to each other while respectively supporting a battery pack 2.

The pack fixing member 40 may more stably support the battery pack 2 by the holding member 50. Since the holding member 50 is coupled to the upper portions of the plurality of pack fixing members 40 adjacent to each other, the adjacent pack fixing members 40 may be more stably supported.

In this case, the holding member 50 may have a simple plate shape, but a recess portion 51 may be formed in the holding member 50. As the recess portion 51 is interposed in a gap between the adjacent pack fixing members 40, the adjacent pack fixing members 40 may be stably coupled.

The recess portion 51 may be configured to be recessed in a downward direction, and the recess portion 51 may be formed to have a width corresponding to the gap between the adjacent pack fixing members 40.

Therefore, even when the adjacent pack fixing members 40 receive a force for being pushed in an outward direction by the battery pack 2, the pack fixing members 40 may be supported not to be pushed in the outward direction due to the recess portion 51.

In addition, the recess portion 51 of a battery case 1 according to an embodiment may be provided to form a leaf spring expanding outwardly by elasticity.

Therefore, the holding member 50 may elastically support the pack fixing member 40. Thereby, the holding member 50 may stably support the pack fixing member 40 while responding flexibly to external impacts or external vibration.

For example, the recess portion 51 may apply an expansion elastic force that expands in the outward direction to the adjacent pack fixing members 40. For this reason, when the force received to be pushed in the outward direction by the pack fixing member 40 is greater than the expansion elastic force, the recess portion 51 may be partially contracted and may support the pack fixing member 40. When the force received to be pushed in the outward direction by the pack fixing member 40 is less than the expansion elastic force, the pack fixing member 40 may be maintained in place by the expansion elastic force of the recess portion 51.

Therefore, the holding member 50 may support the pack fixing member 40 flexibly according to a force to be applied.

As illustrated in FIG. 8, a shape of the plate spring of the recess portion 51 may be a shape forming a concave cross-section in an inward direction, or may be provided to have a bellows shape. The recess portion 51 may add an expansion elastic force within an elastic deformation range. However, the shape of the plate spring of the recess portion 51 is not necessarily limited thereto, and any other leaf spring shape may be employed for the recess portion 51 as long as an expansion elastic force is provided to the pack fixing member 40.

Figure 9:
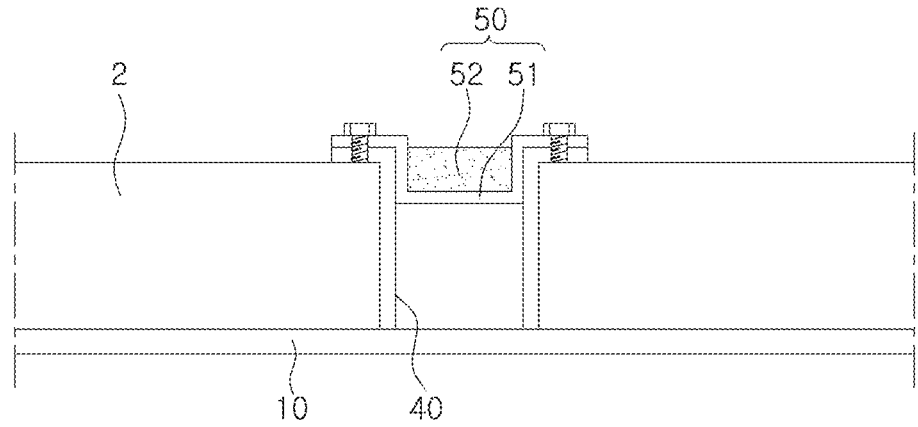
FIG. 9 is a cross-sectional view illustrating an embodiment in which a holding member includes a buffer material in a battery case.

Referring to FIG. 9, a holding member 50 of a battery case 1 according to an embodiment may be provided to have a configuration in which a buffer material 52 is filled in a recess portion 51.

When the holding member 50 supports pack fixing members 40 adjacent to each other, the buffer material 52 may be provided in the recess portion 51, to stably prevent a problem in which the adjacent pack fixing member 40 are further spaced apart from each other in the outward direction.

The buffer material 52 may be formed of a sponge, a metal foam, or the like of which shape is restored. The buffer material 52 may serve to restore the pack fixing member 40 in place.

Figure 10:
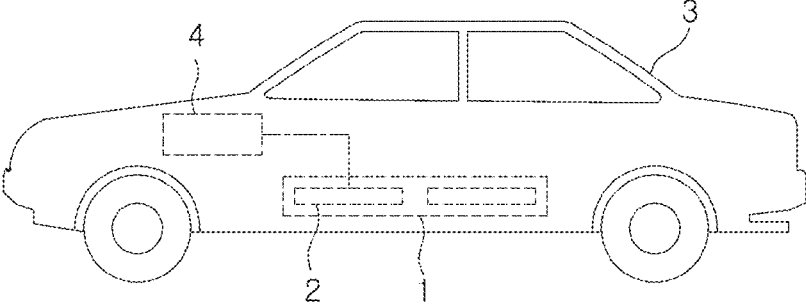
FIG. 10 is a configuration diagram illustrating a battery case and a motor vehicle including the same, according to an embodiment.

Referring to FIG. 10, a motor vehicle according to an embodiment may include a battery case 1 in which a plurality of battery packs 2 are mounted, an engine 4 connected to the battery packs 2 to provide driving force, and a body frame 3 to which the battery case 1 is coupled.

The motor vehicle may include the battery case 1 described above, to effectively absorb external impacts and maintain shapes of the battery packs 2. Therefore, damage or explosion of the battery packs 2 may be prevented.

In another aspect, the motor vehicle may include the battery case 1 described above, to stably fix the battery packs 2 and stably support a pack fixing member 40 while flexibly responding to external impacts or external vibration.

The body frame 3 may form a shape of the motor vehicle, and the engine 4 for generating the driving force may be installed therein.

The engine 4 may be connected to the battery packs 2 mounted in the battery case 1, to receive an electric energy from the battery packs 2 and generate the driving force. Conversely, the engine 4 may also charge the battery packs 2.

The present embodiment, relating to a battery case 1 and a motor vehicle including the same, may effectively absorb external impacts, and may maintain shapes of battery packs 2. Therefore, a problem in which the battery packs 2 are deformed and explode, or external impacts are directly transmitted to the battery packs 2 and the battery packs 2 then explode may be prevented.

A battery case 1 according to an embodiment may include a support member 20, to maintain a shape of the battery case 1 such that the battery packs 2 may not be damaged by deformation or the like due to external impacts. In addition, the battery case 1 may include an absorption member 30 absorbing external impacts while being deformed in shape, to reduce external impacts transmitted to the battery packs 2.

A battery case 1 according to an embodiment may include a pack fixing member 40 to stably fix the battery packs 2. In addition, the pack fixing member 40 may also serve to reinforce rigidity of the battery case 1.

In addition, a battery case 1 according to an embodiment may include a holding member 50 to more stably support the battery pack 2 by the pack fixing member 40. In addition, the holding member 50 may elastically support the pack fixing member 40, to stably support the pack fixing member 40 while responding flexibly to external impacts or external vibration.

While example embodiments have been illustrated and described above, it will be apparent to those skilled in the art that modifications and variations could be made without departing from the scope of the present disclosure as defined by the appended claims.

INDUSTRIAL APPLICABILITY

As described above, the present embodiment may be useful, for example, for a motor vehicle equipped with a battery pack.

The invention claimed is:

1. A battery case comprising:
   a base plate member;
   a support member surrounding the base plate member, formed to have a closed cross-section, and supporting the base plate member;
   an absorption member coupled to an outer side surface of the support member to form a closed cross-section, and absorbing external impacts;
   a pack fixing member including one end portion coupled to the base plate member and the other end portion having a bent shape, and supporting an upper surface of a battery pack seated on the base plate member; and
   a holding member coupled to an upper portion of the pack fixing member.

2. The battery case of claim 1, wherein the absorption member and the support member are integrally formed by forming both end portions of a plate material to have a square closed cross-section, folding a central portion of the plate material at a right angle to form a contact point at which vertices of the square closed cross-section on the both end portions are in contact, and welding the contact point.

3. A motor vehicle comprising:
   the battery case of claim 2 in which a plurality of battery packs are mounted;
   an engine connected to a battery pack to provide driving force; and
   a body frame to which the engine is installed and the battery case is coupled.

4. The battery case of claim 1, wherein the support member comprises a support pipe in an internal space forming the closed cross-section.

5. The battery case of claim 1, wherein the pack fixing member is provided to have a continuous form in a width direction of the base plate member.

6. The battery case of claim 1, wherein the holding member comprises a recess portion interposed in a gap between a plurality of the pack fixing member, adjacent to each other.

7. The battery case of claim 6, wherein the recess portion is provided to form a leaf spring expanding outwardly by elasticity.

8. The battery case of claim 6, wherein the holding member is provided to fill the recess portion with a buffer material.

9. A motor vehicle comprising:
   the battery case of claim 1 in which a plurality of battery packs are mounted;
   an engine connected to a battery pack to provide driving force; and
   a body frame to which the engine is installed and the battery case is coupled.

10. The battery case of claim 1, wherein the absorption member comprises:
   a face plate portion disposed to be spaced apart from the support member by a predetermined interval; and
   a spacer plate portion disposed between the support member and the face plate portion.

11. The battery case of claim 10, wherein at least a portion of the spacer plate portion comprises a wrinkle induction groove, wherein the wrinkle induction groove is formed to have a bellows shape.

\* \* \* \* \*